(12) United States Patent
Kim

(10) Patent No.: US 7,434,563 B2
(45) Date of Patent: Oct. 14, 2008

(54) ROTARY ENGINE

(75) Inventor: Heon Kyu Kim, Seoul (KR)

(73) Assignee: Wontech Co., Ltd., Incheon (KR)

( * ) Notice: Subject to any disclaimer, the term of this patent is extended or adjusted under 35 U.S.C. 154(b) by 0 days.

(21) Appl. No.: 11/218,713

(22) Filed: Sep. 6, 2005

(65) Prior Publication Data
US 2006/0065233 A1    Mar. 30, 2006

(30) Foreign Application Priority Data
Sep. 24, 2004    (KR) .................... 10-2004-0076759

(51) Int. Cl.
F02B 53/00    (2006.01)
F01C 1/063    (2006.01)
(52) U.S. Cl. .................. 123/242; 123/200; 123/228; 418/61.2; 418/61.3
(58) Field of Classification Search ............ 123/242, 123/220, 228; 418/61.2, 61.3
See application file for complete search history.

(56) References Cited

U.S. PATENT DOCUMENTS

| | | | | | |
|---|---|---|---|---|---|
| 2,993,482 | A | * | 7/1961 | Froede ...................... | 123/213 |
| 3,062,435 | A | * | 11/1962 | Bentele .................... | 418/61.2 |
| 3,196,855 | A | * | 7/1965 | Jones ....................... | 418/61.2 |
| 3,226,013 | A | * | 12/1965 | Toyoda et al. .............. | 418/61.2 |
| 3,285,189 | A | * | 11/1966 | Doyer ....................... | 123/242 |
| 3,301,228 | A | * | 1/1967 | Winans ...................... | 123/220 |
| 3,405,692 | A | * | 10/1968 | Paschke ..................... | 418/61.2 |
| 3,628,899 | A | * | 12/1971 | George ...................... | 418/61.2 |
| 3,762,840 | A | * | 10/1973 | Merz ........................ | 418/61.2 |
| 3,762,842 | A | * | 10/1973 | George, Jr. ................. | 418/61.2 |
| 3,800,760 | A | * | 4/1974 | Knee ........................ | 123/242 |
| 3,847,514 | A | * | 11/1974 | Chen et al. ................. | 418/61.2 |
| 3,967,594 | A | * | 7/1976 | Campbell .................... | 123/242 |
| 3,993,029 | A | * | 11/1976 | Eiermann et al. ............. | 123/203 |
| 4,008,982 | A | * | 2/1977 | Traut ........................ | 418/61.3 |
| 4,111,617 | A | * | 9/1978 | Gale et al. .................. | 418/61.3 |
| 4,233,003 | A | * | 11/1980 | Jeng ......................... | 418/61.3 |
| 4,410,299 | A | * | 10/1983 | Shimoyama ................... | 418/61.2 |
| 5,399,078 | A | * | 3/1995 | Kuramasu .................... | 418/61.2 |
| 5,410,998 | A | * | 5/1995 | Paul et al. .................. | 418/61.2 |

(Continued)

FOREIGN PATENT DOCUMENTS

JP    10-220238    8/1998

(Continued)

*Primary Examiner*—Thai-Ba Trieu
(74) *Attorney, Agent, or Firm*—Venable LLP; Catherine M. Voorhees

(57) ABSTRACT

The rotary engine includes a cylinder body having a cylinder chamber, an intake port, an exhaust port, and a spark plug, and a rotor which is received in the cylinder chamber to eccentrically rotate while coming into contact at seal faces thereof with an inner circumferential contact wall of the cylinder chamber to thereby implement intake, compression, expansion, and exhaust strokes. The rotor has an elliptical outer contour, and the inner circumferential contact wall of the cylinder chamber coincides with a specific curve, which is described by opposite apexes of the elliptical rotor in a direction of a major axis, when the rotor eccentrically rotates. The intake port and exhaust port are provided with opening/closing valves, respectively. Sealing performance between the cylinder chamber and the rotor may achieve an enhancement in the efficiency of fuel combustion and engine output and prevent waste of fuel.

2 Claims, 23 Drawing Sheets

U.S. PATENT DOCUMENTS

| | | | | |
|---|---|---|---|---|
| 5,439,357 A | * | 8/1995 | Barthod et al. | 418/61.3 |
| 5,810,574 A | * | 9/1998 | Marx et al. | 418/61.3 |
| 6,892,697 B2 | * | 5/2005 | Karem | 123/319 |
| 6,983,729 B2 | * | 1/2006 | Schapiro et al. | 123/242 |

FOREIGN PATENT DOCUMENTS

| | | |
|---|---|---|
| KR | 1991-0008255 | 5/1991 |
| KR | 10-2003-0083343 | 10/2003 |

* cited by examiner

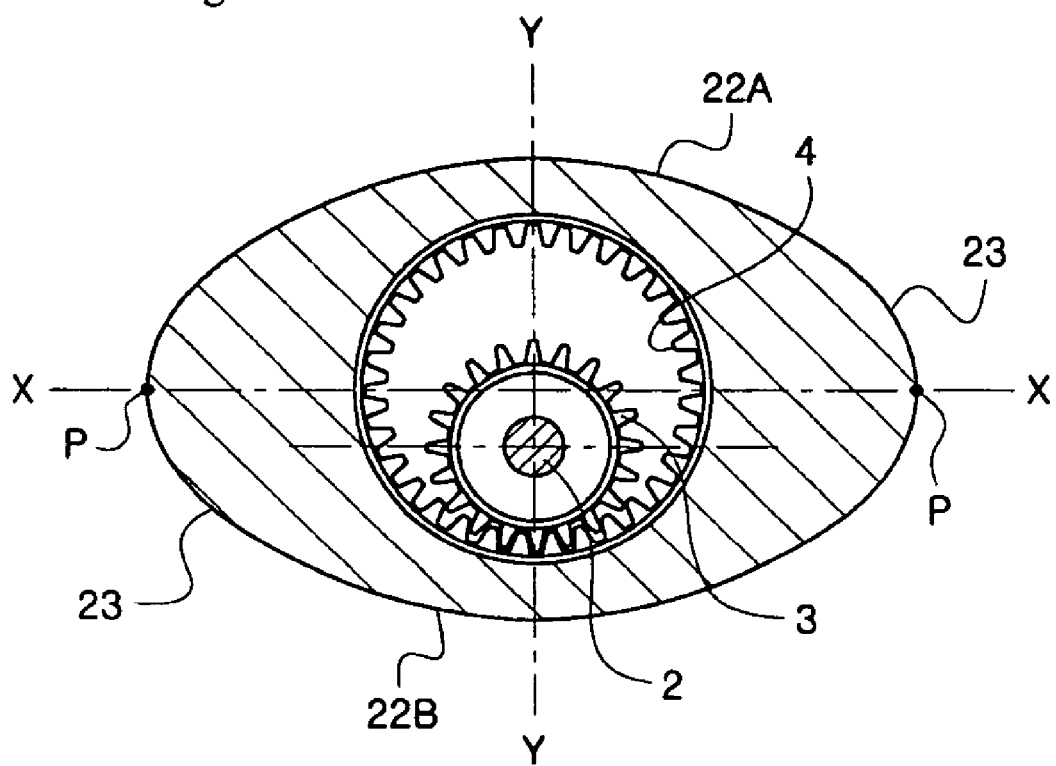

⟨end of intake/
beginning of compression⟩

ROTARY ENGINE

BACKGROUND OF THE INVENTION

1. Field of the Invention

The present invention relates to a rotary engine, and, more particularly, to a rotary engine which can improve sealing performance between an inner circumferential contact wall of a cylinder chamber and a seal face of a rotor that comes into contact with the inner circumferential contact wall and can minimize leakage of gas mixture during a compression stroke to reduce exhaust gas, thereby achieving an enhancement in engine output and an enhancement in fuel efficiency.

2. Description of the Related Art

A rotary engine is designed to obtain rotational power by performing four strokes, for example, intake, compression, expansion, and exhaust strokes, as in a piston reciprocating engine. However, the rotary engine clearly differs from the piston reciprocating engine in the structure of a mover which is used to induce the four strokes. In the piston reciprocating engine, the four strokes are induced as the reciprocating motion of a piston is converted into the rotating motion of a crankshaft.

That is, the piston reciprocating engine obtains rotational power as a piston, which is coupled to a crankshaft, linearly reciprocates in a cylinder to implement four strokes. On the other hand, the rotary engine obtains rotational power as a rotor, which serves as a piston, rotates in a cylinder to implement four strokes. Another great difference between the piston reciprocating engine and the rotary engine is that the rotational power obtained by the rotor is directly transmitted to an output shaft.

Considering the general structure of the rotary engine, an eccentric shaft is coupled to the center of a triangular rotor to lead the position of the rotor. Thereby, when the rotor rotates, respective vertexes of the triangular rotor describe a specific curve, which determines the shape of a cylinder chamber. Normally, the cylinder chamber has an elliptical or peanut shape.

The triangular rotor divides the peanut shaped cylinder chamber into three cylinder chambers, so that the three cylinder chambers implement four strokes independently. On the other words, three expansion strokes occur per every rotation of the rotor, generating rotational power. The rotary engine has an advantage of temporarily raising angular velocity of the rotor because it has no inverted inertia as seen in the piston reciprocating engine.

However, the rotary engine, having the above described configuration, has a problem in that a contact angle between the inner circumferential contact wall of the cylinder chamber and a seal face of the rotor for the maintenance of air-tightness greatly varies in a range of ±20°. Also, it is impossible to maintain perfect air-tightness because the inner wall of the cylinder chamber shows uneven wear differently from the piston reciprocating engine, and, in particular, it is difficult to maintain air-tightness during a compression stroke. This is a representative disadvantage occurred in most rotary engines.

Due to the imperfect air-tightness between the inner circumferential contact wall of the cylinder chamber and the seal face of the rotor, the conventional rotary engine suffers from degradation in engine performance, and causes gas mixture to leak during the compression stroke to thereby be exhausted in uncombusted state. This disadvantageously results in waste of fuel and air pollution.

Thus, the maintenance of perfect air-tightness is the most urgent subject to be solved for the development and performance enhancement of the rotary engine.

SUMMARY OF THE INVENTION

Therefore, the present invention has been made in view of the above problems, and it is an object of the present invention to provide a rotary engine in which a contact angle between the inner circumferential contact wall of a cylinder chamber and a seal face of a rotor is continuously kept at a constant value to improve sealing performance, thereby achieving only slight even wear in the inner circumferential contact wall of the cylinder chamber and achieving an enhancement in the efficiency of fuel combustion and an enhancement in engine output.

It is another object of the present invention to provide a rotary engine capable of preventing gas mixture, which leaks during a compression stroke, from being discharged in an uncombusted state, thereby preventing waste of fuel and air pollution.

It is yet another object of the present invention to provide a rotary engine in which gas mixture, which leaks during a compression stroke, is supercharged in an intake stroke rather than being exhausted, thereby achieving an enhancement in the efficiency of fuel combustion and an enhancement in engine output.

In accordance with the present invention, the above and other objects can be accomplished by the provision of a rotary engine comprising: a cylinder body having a cylinder chamber, an intake port, an exhaust port, and at least one spark plug; and a rotor received in the cylinder chamber and adapted to eccentrically rotate while coming into contact at seal faces thereof with an inner circumferential contact wall of the cylinder chamber to thereby implement intake, compression, expansion, and exhaust strokes, wherein the rotor has an elliptical outer contour, and the inner circumferential contact wall of the cylinder chamber coincides with a specific curve, which is described by opposite apexes of the elliptical rotor in a direction of a major axis, when the rotor eccentrically rotates.

Preferably, the inner circumferential contact wall of the cylinder chamber may include a first side having the intake port, a second side having the spark plug, and a third side having the exhaust port, the first to third sides being successively formed.

Preferably, the intake port may be provided with an opening/closing intake valve which closes the intake port from the beginning of the expansion stroke to the beginning of the exhaust stroke and opens the intake port from the beginning of the exhaust stroke to a next expansion stroke, and the exhaust port may be provided with an opening/closing exhaust valve which opens the exhaust port from the beginning of the exhaust stroke to the end of the exhaust stroke and closes the exhaust port from the end of the exhaust stroke to the beginning of a next exhaust stroke.

Preferably, the cylinder chamber, rotor, and opening/closing valves may form a single cylinder unit, and a plurality of cylinder units may be arranged in the cylinder body in parallel to one another in an axial direction of an output shaft.

Preferably, the two cylinder units may form a group so that the rotors thereof are arranged to cross each other with a phase difference of 90°, and two superchargers may be provided, respectively, between the intake port and the spark plug of a respective one of the two cylinder units, and are connected to each other via a bypass channel, each supercharger being provided with an opening/closing valve.

Preferably, the rotary engine may further comprise supercharging means for temporarily storing uncombusted gas, which leaks from between the inner circumferential contact wall of the cylinder chamber and seal members during the compression stroke and for supercharging the stored uncombusted gas into the cylinder chamber in which the intake stroke is implemented.

BRIEF DESCRIPTION OF THE DRAWINGS

The above and other objects, features and other advantages of the present invention will be more clearly understood from the following detailed description taken in conjunction with the accompanying drawings, in which:

FIG. 2 is a schematic front view illustrating the eccentric rotation structure of a rotor included in the rotary engine according to the first embodiment of the present invention;

FIG. 8 is a sectional view taken along the line B-B shown in FIG. 7a.

DESCRIPTION OF THE PREFERRED EMBODIMENTS

Now, preferred embodiments of the present invention will be explained with reference to the accompanying drawings.

Figure 1:
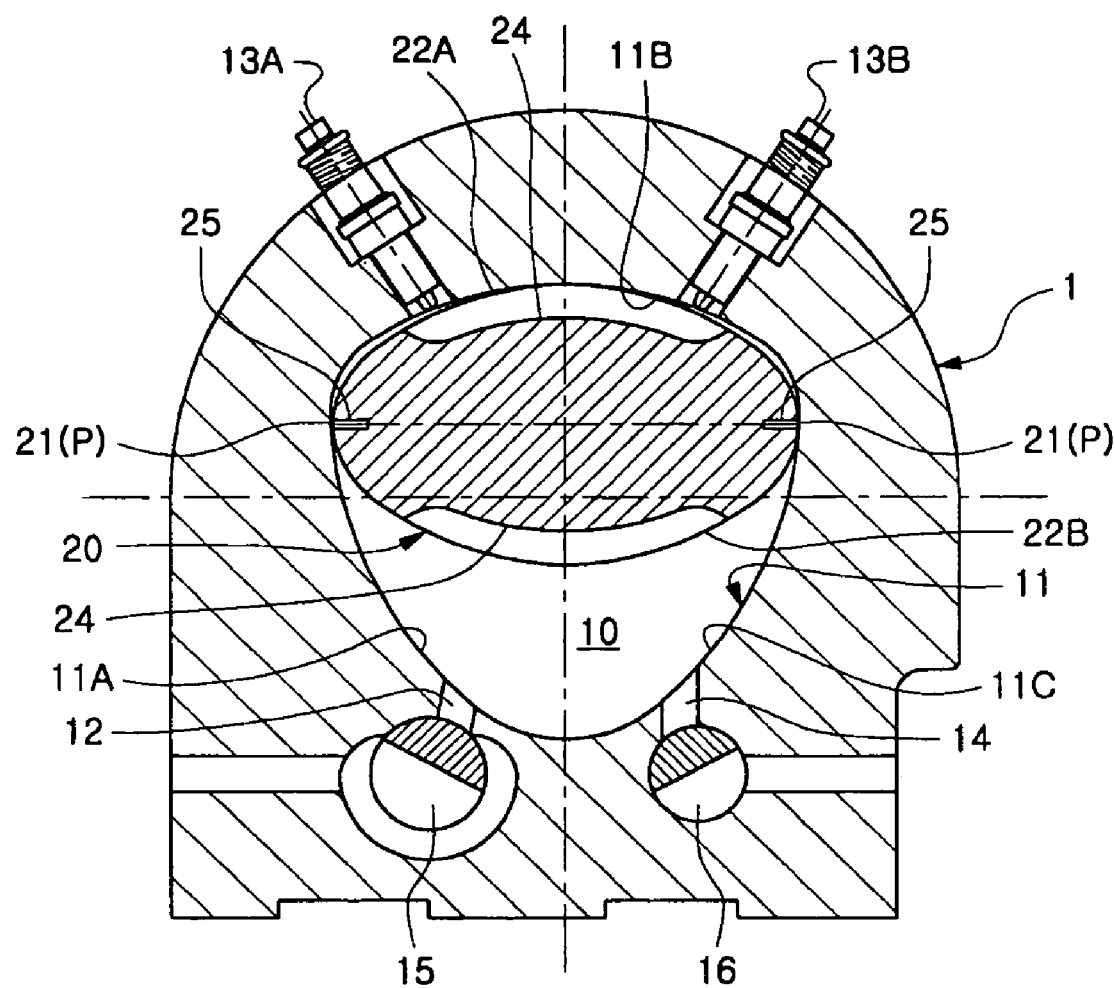
FIG. 1 is a schematic configuration diagram illustrating a rotary engine according to a first embodiment of the present invention.

FIG. 1 is a schematic configuration diagram illustrating a rotary engine according to a first embodiment of the present invention. As shown in FIG. 1, the rotary engine according to the present embodiment comprises a cylinder body 1 having a cylinder chamber 10, and a rotor 20, which is received in the cylinder chamber 10 to eccentrically rotate.

The rotor 20 has an elliptical shape, and is provided at opposite apexes P thereof in a direction of a major axis X-X with seal faces 21, which come into contact with an inner circumferential contact wall 11 of the cylinder chamber 10. The cylinder chamber 10 has the same shape as a specific curve which is described by the opposite apexes P when the rotor 20 eccentrically rotates. The inner circumferential contact wall 11 of the cylinder chamber 10 includes arcuate first to third sides 11A to 11C, and connecting portions between the respective edges of the first to third sides 11A to 11C are curved, whereby the inner circumferential contact wall 11 has an approximately triangular shape. Preferably, the inner circumferential contact wall 11 is subjected to a special coating treatment in consideration of wear and heat generation caused when the rotor 20 comes into contact with the inner circumferential contact wall 11.

The rotor 20 has first and second large-diameter faces 22A and 22B at opposite sides thereof in a direction of a minor axis Y-Y. The first and second large-diameter faces 22A and 22B have approximately the same shape as the arcuate first to third sides 11A to 11C. The rotor 20 also has small-diameter faces 23 at opposite sides thereof in the direction of the major axis X-X, which have approximately the same shape as the curved connecting portions between the respective edges of the first to third sides 11A to 11C. Recesses 24 are formed at the first and second large-diameter faces 22A and 22B to define gaps between the first and second large-diameter faces 22A and 22B of the rotor 20 and the inner circumferential contact wall 11 of the cylinder chamber 10. As stated above, the apexes P of the rotor 20 in the direction of the major axis X-X form the seal faces 21 which come into contact with the inner circumferential contact wall 11 of the cylinder chamber 10, and seal members 25 are mounted to the seal faces 21, respectively.

The cylinder body 1 has an intake port 12 to introduce gas mixture into the cylinder chamber 10, two spark plugs 13A and 13B to ignite compressed gas, and an exhaust port 14 to discharge combusted gas after ignition of the compressed gas. The intake port 12 is located at the first side 11A of the inner circumferential contact wall 11 of the cylinder chamber 10 at a position proximate to the third side 11C. One of the spark plugs 13A is located at the second side 11B at a position proximate to the first side 11A, and the other spark plug 13B is located at the second side 11B at a position proximate to the third side 11C. The exhaust port 14 is located at the third side 11C at a position proximate to the first side 11A.

In the rotary engine of the present invention, the intake port 12 and the exhaust port 14 are provided with opening/closing valves 15 and 16, respectively. The opening/closing valve 15, provided at the intake port 12, operates to close the intake port 12 from the beginning of an expansion stroke to the beginning of an exhaust stroke, and to open the intake port 12 from the beginning of the exhaust stroke to a next expansion stroke. On the other hand, the opening/closing valve 16, provided at the exhaust port 14, operates to open the exhaust port 14 from the beginning of the exhaust stroke to the end of the exhaust stroke, and to close the exhaust port 14 from the end of the exhaust stroke to the beginning of a next exhaust stroke. Preferably, the opening/closing valves 15 and 16 are adapted to rotate at a predetermine rotation ratio upon receiving rotational power from an output shaft 2 via rows of gears (not shown).

FIG. 2 is a schematic front view illustrating the eccentric rotation principle of the rotor 20 included in the rotary engine of the present invention. The rotor 20 is mounted to eccentrically rotate around the output shaft 2. An external gear 3 is provided at the outer circumference of the output shaft 2, and an internal gear 4 is provided at the inner circumference of the rotor 20 to be engaged with the external gear 3.

Thereby, when the output shaft 2 rotates, the rotor 20 eccentrically rotates about the output shaft 2 at a predetermined rotation ratio, which is determined by a difference in diameters of both the external and internal gears 3 and 4. In the present embodiment, the rotation ratio, determined by the external and internal gears 3 and 4, is set to 4:1. For example, if the output shaft 2 rotates two revolutions by 720°, the rotor 20 rotates a half revolution by 180°, so that one expansion stroke is implemented. Admittedly, the rotation ratio is not limited to the above value, and is variable in consideration of the performance and output of the rotary engine.

In the rotary engine having the above described configuration, the rotor 20 eccentrically rotates while coming into contact with the inner circumferential contact wall 11 of the cylinder chamber 10 at the seal members 25 which are provided at the opposite apexes P thereof, whereby four strokes, i.e. intake, compression, expansion, and exhaust strokes, are implemented to generate rotational power.

FIGS. 3a to 3f are schematic diagrams illustrating a four stroke cycle of the rotary engine according to the first embodiment of the present invention. From FIGS. 3a to 3f, the output shaft 2 rotates in stages by 120°, and the rotation ratio is set so that the rotor 20 rotates in stages by 30° and the opening/closing valves 15 and 16 rotate in stages by 60°.

Figure 3A:
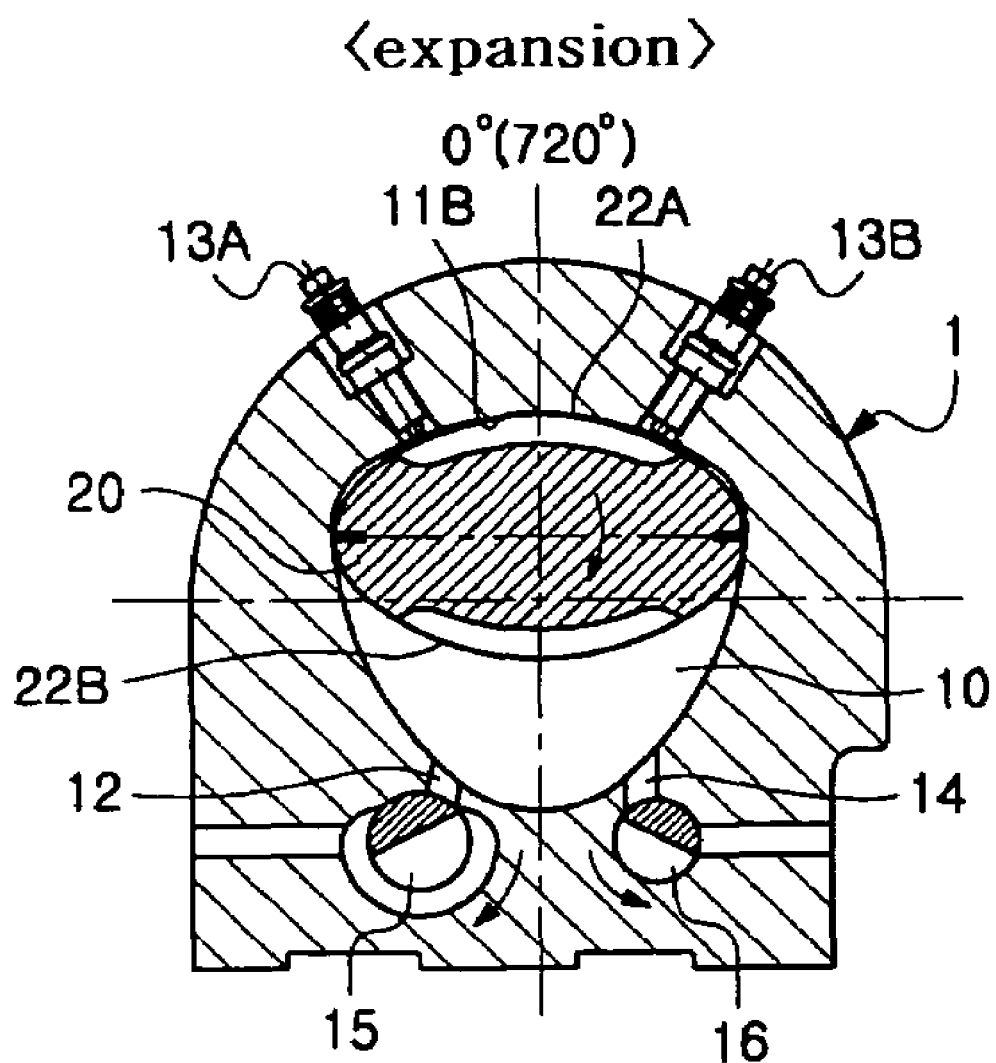
FIGS. 3a to 3f are schematic diagrams illustrating a four stroke cycle of the rotary engine according to the first embodiment of the present invention.

FIG. 3a illustrates an expansion stroke in which the output shaft 2 has a zero rotation angle and the rotor 20 is positioned so that the first large-diameter face 22A coincides with the second side 11B of the cylinder chamber 10. In the expansion stroke, compressed gas mixture, having passed through intake and compression strokes to be explained hereinafter, is ignited by the two spark plugs 13A and 13B. The intake and exhaust opening/closing valves 15 and 16 continuously close the intake port 12 and the exhaust port 14.

Figure 3B:
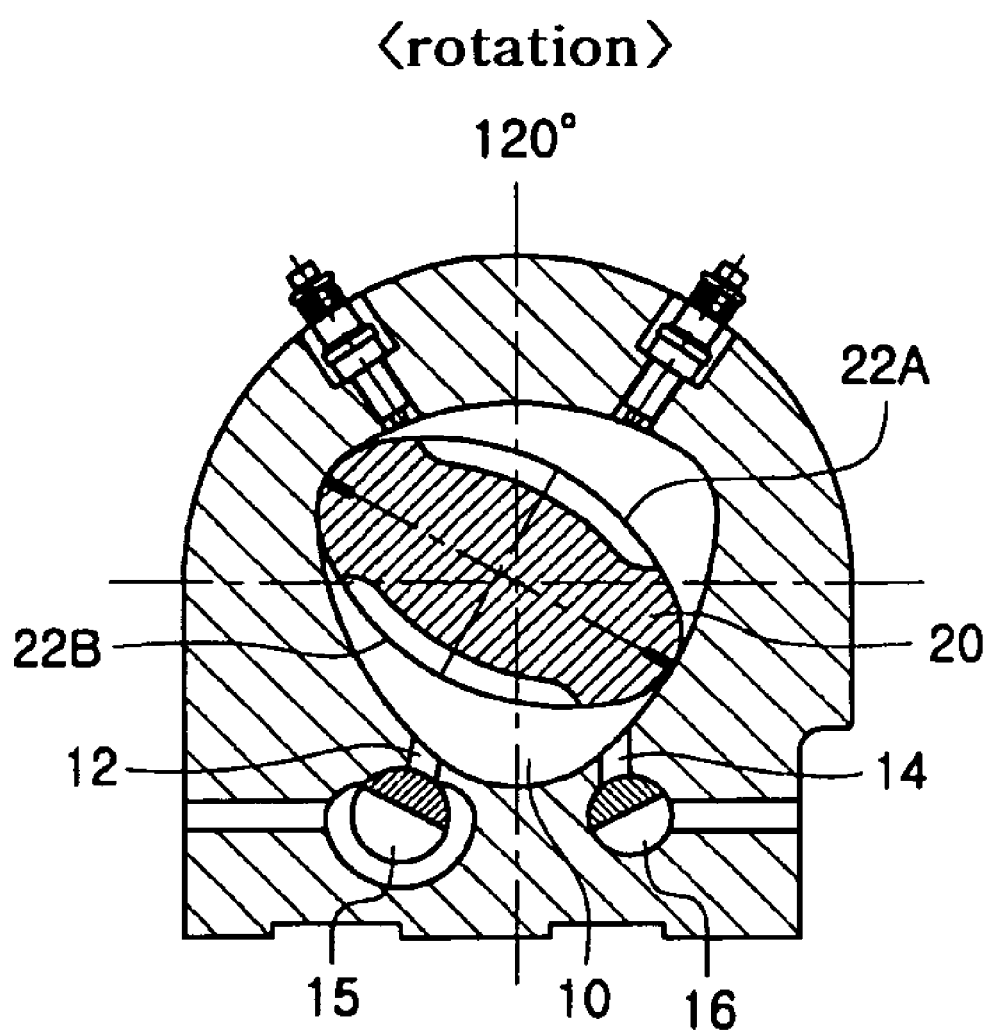

FIG. 3b illustrates rotation of the rotor 20 using rotational power obtained by the expansion stroke. The output shaft 2 rotates by 120° and the rotor 20 rotates by 30° in a clockwise direction. The intake and exhaust opening/closing valves 15 and 16 rotate by 60° in directions designated by arrows of FIG. 3a, and continuously close the intake port 12 and the exhaust port 14.

Figure 3C:
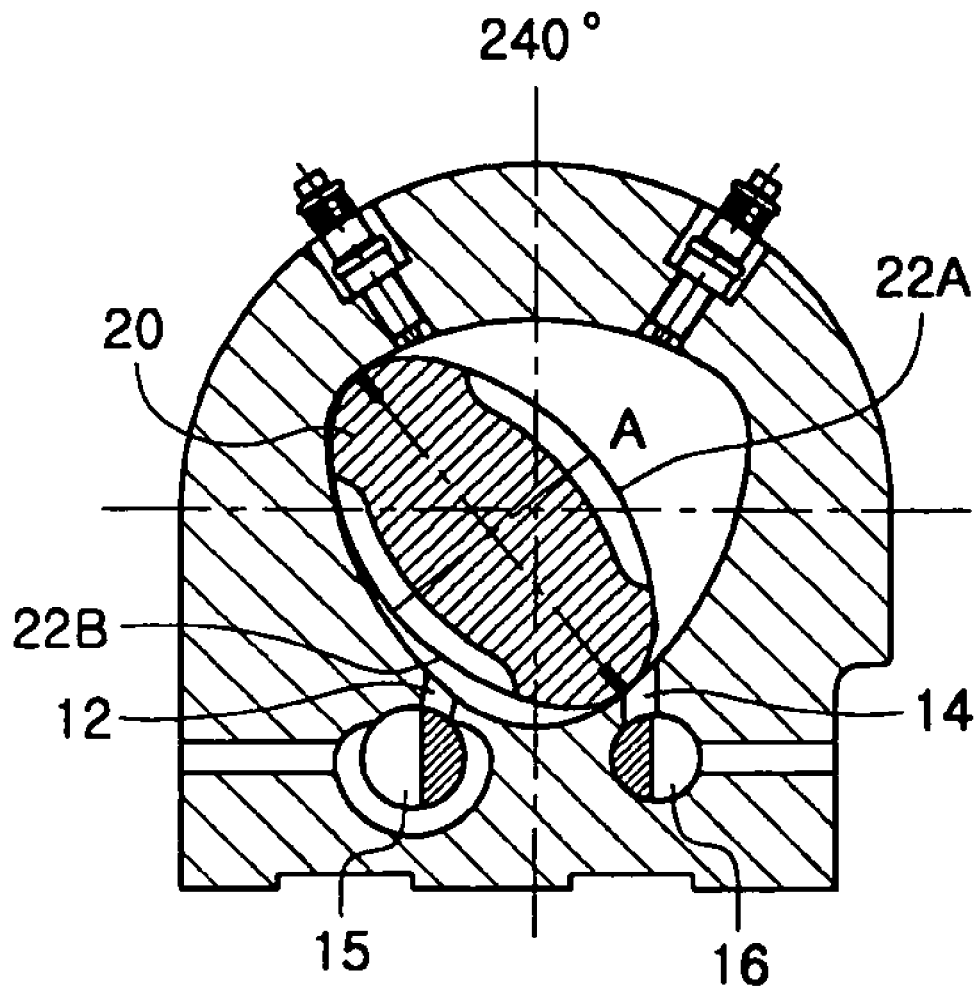

FIG. 3c illustrates the beginning of an exhaust stoke in which the output shaft 2 rotates by 240° and the rotor 20 rotates by 60°. The intake and exhaust opening/closing valves 15 and 16 rotate by 120° to continuously open the intake port 12 and the exhaust port 14, but are in a state immediately prior to switching the intake port 12 and the exhaust port 14 from a closed state to an open state.

Figure 3D:
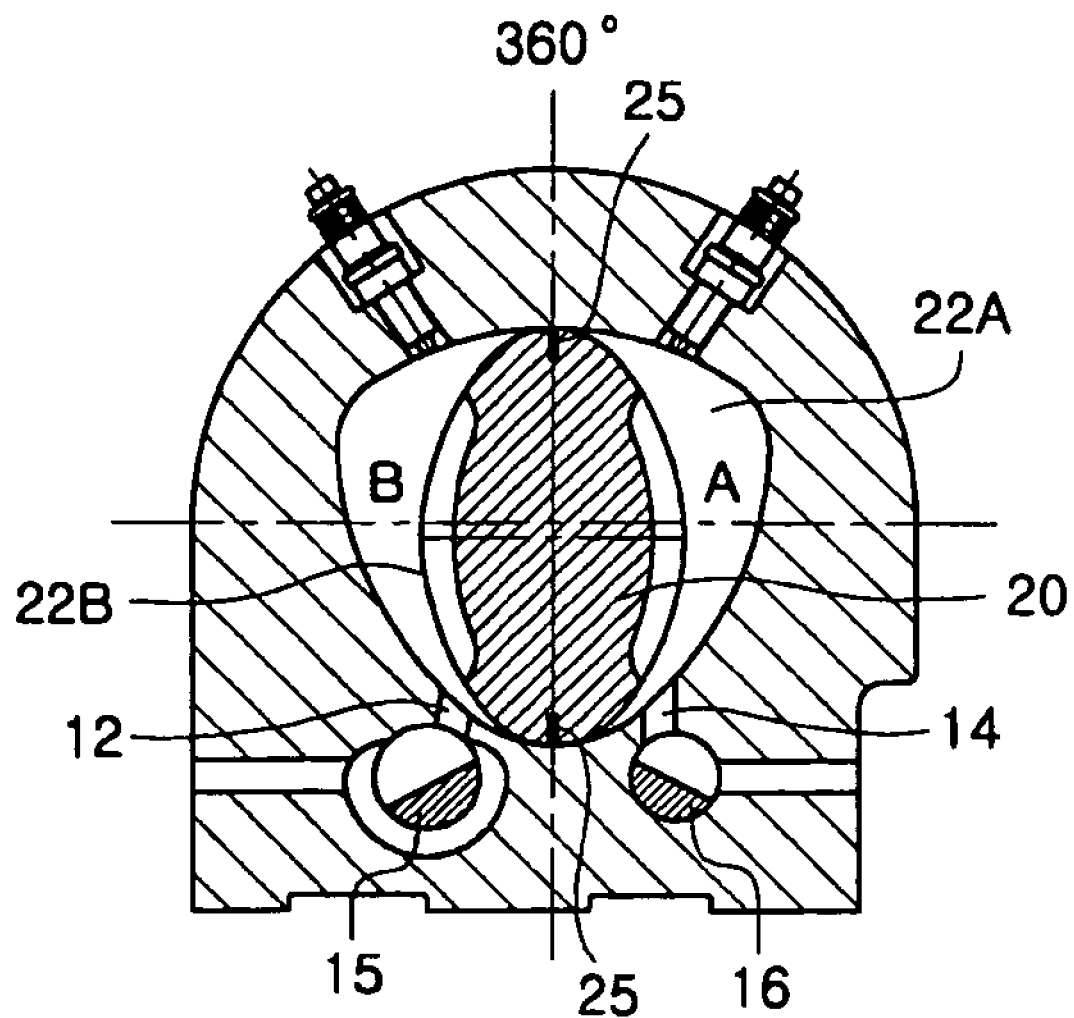

FIG. 3d illustrates exhaust/intake stokes strokes in which the output shaft 2 rotates one revolution by 360° and the rotor 20 rotates by 90°. The intake and exhaust opening/closing valves 15 and 16 rotate by 180°, respectively, and open the intake port 12 and the exhaust port 14. Thereby, the exhaust gas inside a section A of the cylinder chamber 10 is discharged through the exhaust port 14 and, simultaneously, the gas mixture is introduced into a section B of the cylinder chamber 10 through the intake port 12. Here, the exhaust stroke inside section A of the cylinder chamber 10 and intake strokes inside section B thereof can be simultaneously implemented when one seal face 21 of the rotor 20 is between the intake and exhaust port and both of the intake/exhaust valves are open, as shown in FIG. 3d. The sections A and B are sealed from each other by the seal members 25 provided at opposite sides of the rotor 20.

Figure 3E:
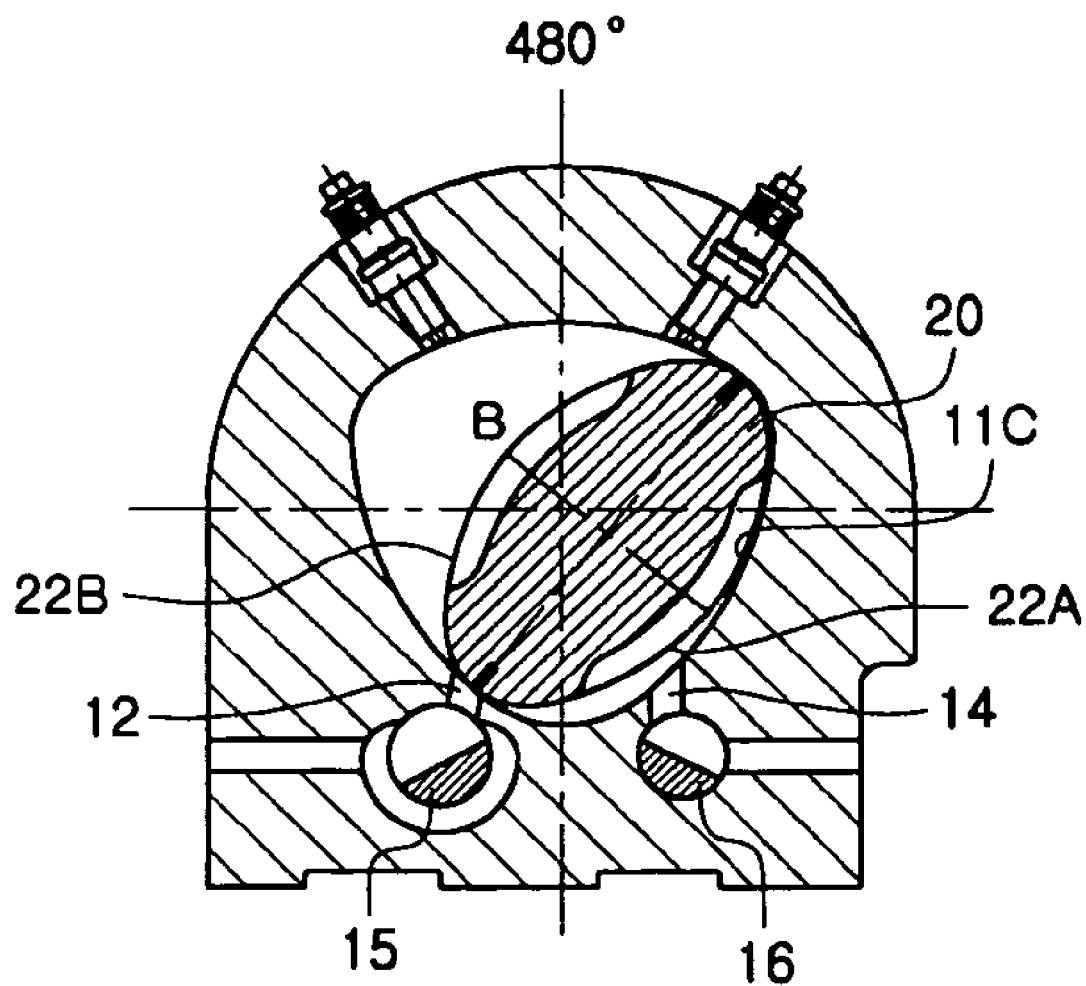

FIG. 3e illustrates the end of the exhaust stroke/the beginning of a compression stoke in which the output shaft 2 rotates by 480° and the rotor 20 rotates by 120°. In this position, the first large-diameter face 22A of the rotor 20 coincides with the third side 11C, so that the exhaust gas inside the section A is completely discharged through the exhaust port 14 and the volume of the section B is maximized to introduce a large amount of the gas mixture into the section B through the intake port 12. The intake and exhaust opening/closing valves 15 and 16 rotate by 240° to continuously open the intake port 12 and the exhaust port 14, but the opening/closing valve 16 is in a state immediately prior to closing the exhaust port 14.

Figure 3F:
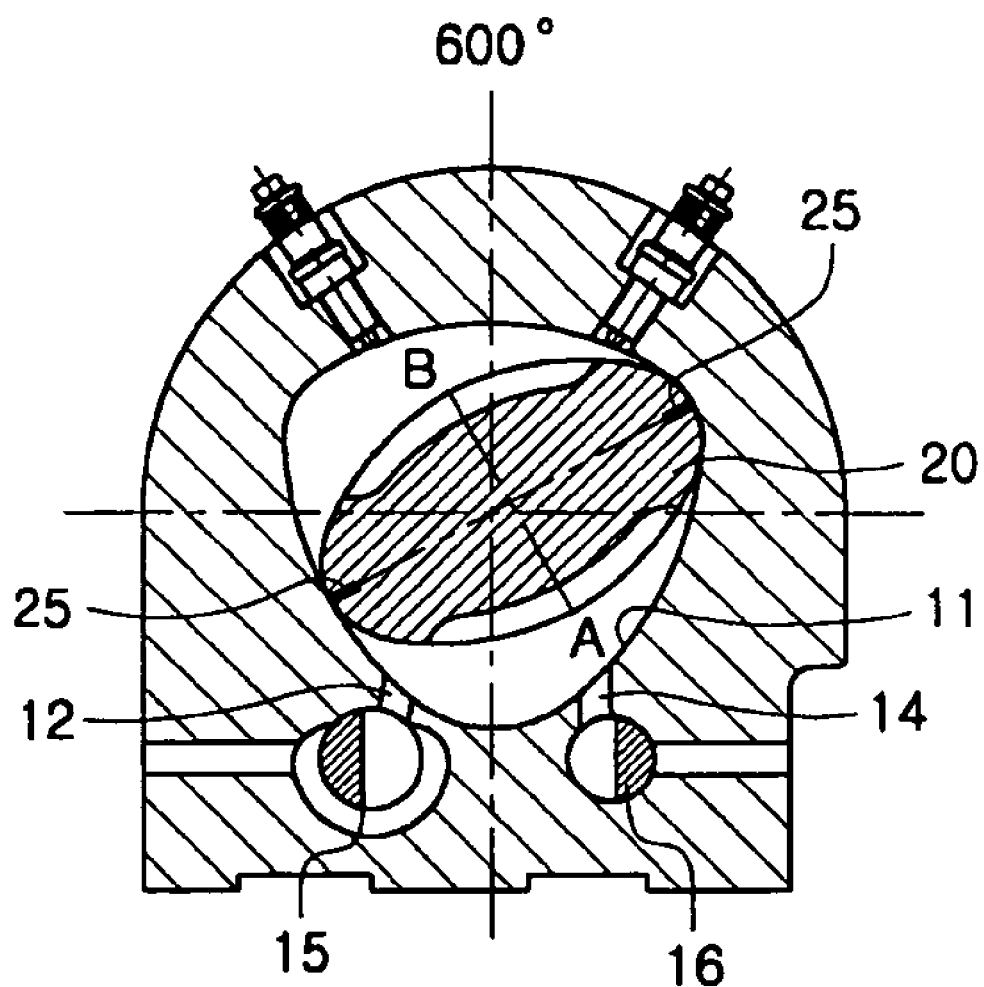

FIG. 3f illustrates a compression stroke in which the output shaft 2 rotates by 600° and the rotor 20 rotates by 150°. In this position, the gas mixture inside the section B is compressed, and the intake and exhaust opening/closing valves 15 and 16 rotate by 360°, so that the opening/closing valve 15 opens the intake port 12 and the opening/closing valve 16 closes the exhaust port 14. Thereby, the gas mixture, which leaks from between the seal members 25 of the rotor 20 and the inner circumferential contact wall 11 of the cylinder chamber 10 during the compression stroke, is able to remain in the section A, rather than being discharged through the exhaust port 14. The gas mixture inside the section A is able to be used in the next intake stroke.

Finally, as the output shaft 2 rotates two revolutions by 720°(0°), the rotor 20 rotates a half revolution by 180°, and the intake and exhaust opening/closing valves 15 and 16 rotate one revolution, respectively, by 360° as shown in FIG. 3a, the initial expansion stroke is implemented, completing a four stroke cycle.

In the present embodiment as stated above, when the output shaft 2 rotates two revolutions by 720°, the rotor 20 rotates a half revolution by 180° to implement the expansion, exhaust, intake, and compression strokes in this order so as to complete one-cycle of the rotary engine. The intake and exhaust opening/closing valves 15 and 16 rotate one revolution by 360° to open or close the intake port 12 and the exhaust port 14 during the four stroke cycle. When the rotor 20 rotates by 180°, the first and second large-diameter faces 22A and 22B of the rotor 20 alternately implements the expansion stroke once per cycle.

With the rotary engine according to the first embodiment of the present invention, when the rotor 20 eccentrically rotates, the shape of the inner circumferential contact wall 11 of the cylinder chamber 10 coincides with the specific curve described by the opposite apexes P of the rotor 20 in the direction of the major axis X-X. Thus, the major axis X-X of the rotor 20 continuously comes into contact with the inner circumferential contact wall 11 of the cylinder chamber 10 perpendicular thereto.

In the present invention, since the seal members 25 are mounted to the apexes P of the rotor 20 to come into contact with the inner circumferential contact wall 11 of the cylinder chamber 10 perpendicular thereto, the sealing structure between the rotor 20 and the cylinder chamber 10 is simplified without the risk of a great variation in the contact angle therebetween as in the prior art. The seal members 25 have a simplified structure and are easy to mount. Furthermore, since the seal members 25 maintain continuous sliding contact with the inner circumferential contact wall 11 of the cylinder chamber 10 perpendicular thereto, the inner circumferential contact wall 11 of the cylinder chamber 10 entirely exhibits only slight even wear. This effectively minimizes degradation in sealing performance due to uneven wear.

In particular, since the opening/closing valve 16 opens the exhaust port 14 only from the beginning of the exhaust stroke to the end of the exhaust stroke and to close the exhaust port 14 in the remaining strokes, the gas mixture, which leaks from between the inner circumferential contact wall 11 of the cylinder chamber 10 and the seal members 25 during the compression stroke as shown in FIG. 3f, is able to remain in the section A, rather than being discharged through the exhaust port 14. This effectively prevents discharge of uncombusted gas to the outside, thereby preventing waste of fuel and air pollution.

Figure 4:
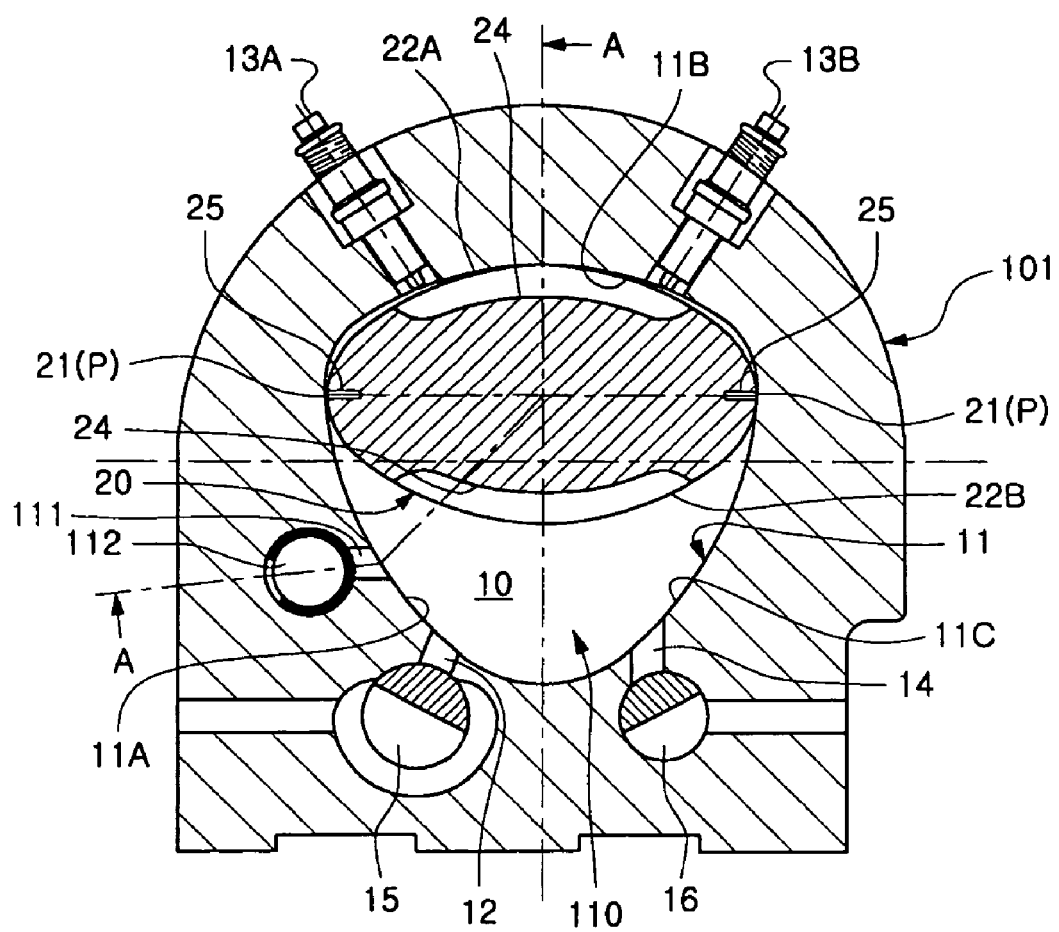
FIG. 4 is a schematic configuration diagram illustrating a rotary engine according to a second embodiment of the present invention.
Figure 5:
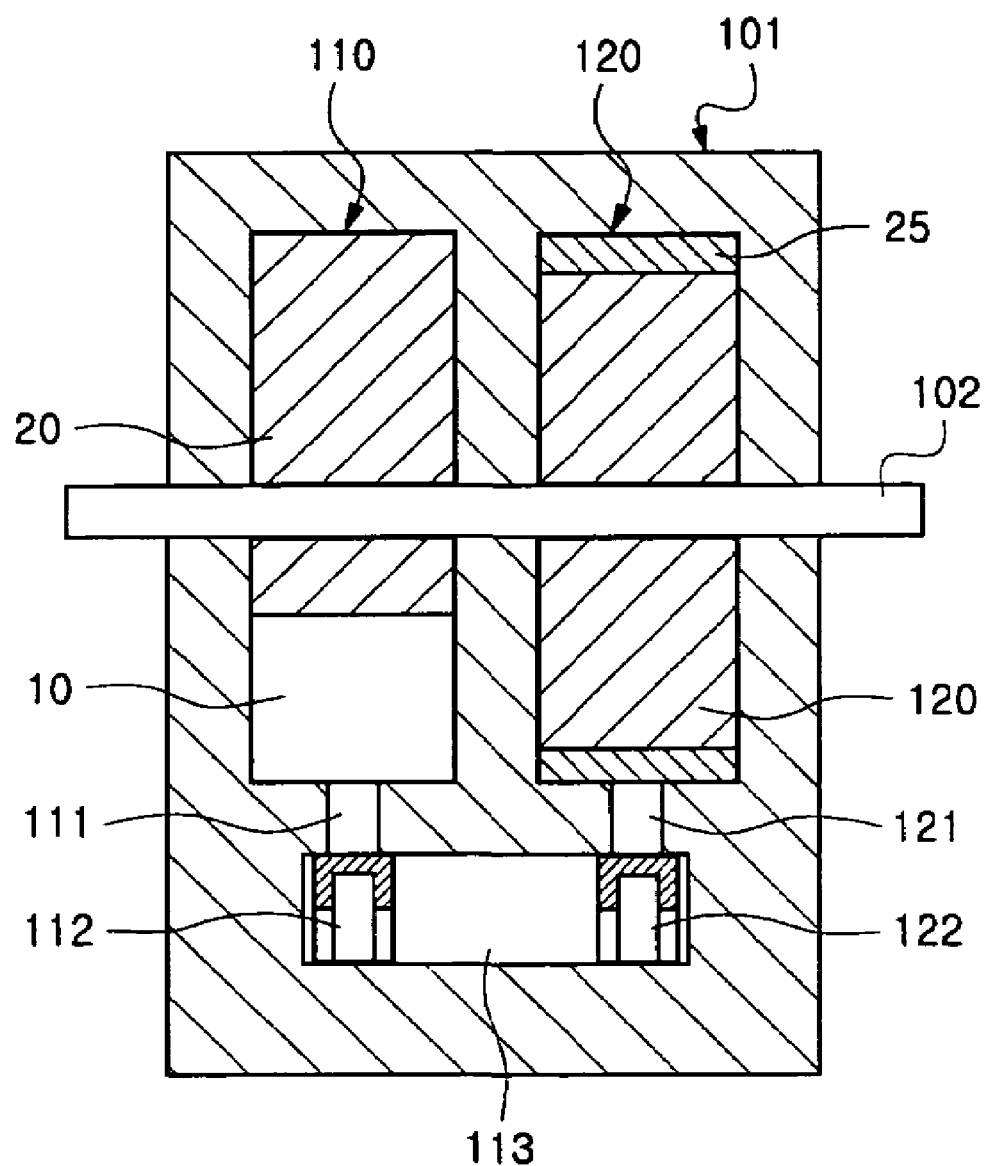
FIG. 5 is a sectional view taken along the line A-A shown in FIG. 4.

FIGS. 4 and 5 illustrate a rotary engine according to a second embodiment of the present invention. In the present embodiment, the configuration and functions of the cylinder chamber 10 having the intake port 12 and the exhaust port 14, the rotor 20, the opening/closing valves 15 and 16 mounted to the intake port 12 and the exhaust port 14, and the seal members 25 are identical to the first embodiment. Thus, the identical elements are designated by the same reference numerals as the first embodiment, respectively, and no description thereof will be given.

The rotary engine according to the second embodiment of the present invention comprises a cylinder body 101 having two cylinder units, i.e. first and second cylinder units 110 and 120, which are arranged in parallel to each other in an axial direction of an output shaft 102. The rotary engine further comprises a pair of rotors 20, which are received in the first and second cylinder units 110 and 120, respectively, to cross each other with a phase difference of 90°.

The first and second cylinder units 110 and 120 have superchargers 111 and 121, respectively. The superchargers 111 and 121 are located between the intake port 12 and the spark plug 13A of the respective cylinder chambers 10, i.e. at the first side 11A of the respective cylinder chambers 10. As shown in FIG. 5, the superchargers 111 and 121 are connected to each other through a bypass channel 113 provided in the cylinder body 101.

The superchargers 111 and 121 are provided with opening/closing valves 112 and 122, respectively. Referring to FIGS. 6b and 6c, the opening/closing valve 112 opens the supercharger 111 of the first cylinder unit 110 from the rotational power generation stroke/the beginning of a supercharging stroke to the beginning of an exhaust stroke/the end of the supercharging stroke, and the opening/closing valve 122 opens the supercharger 121 of the second cylinder unit 120 from the beginning of a compression stroke/the beginning of a super-intake stroke to the compression stroke/the end of the super-intake stroke. Also, referring to FIGS. 6e and 6f, the opening/closing valve 112 closes the supercharger 111 of the first cylinder unit 110 from the beginning of the compression stroke/the beginning of the super-intake stroke to the compression stroke/the end of the super-intake stroke, and the opening/closing valve 122 closes the supercharger 121 of the second cylinder unit 120 from the rotational power generation stroke/the beginning of the supercharging stroke to the beginning of the exhaust stroke/the end of the supercharging stroke.

The opening/closing valves 112 and 122 having the above-described configuration are adapted to rotate relative to the output shaft 102 at a predetermined rotation ratio upon receiving rotational power from the output shaft 102 via rows of gears (not shown). Here, the rotation ratio of the valves 112 and 122 to the output shaft 102 is set to 1:1.

Now, the four stroke cycle of the rotary engine according to the second embodiment of the present invention will be explained with reference to FIGS. 6a to 6f. In the same manner as the first embodiment, the output shaft 2 rotates in stages by 120°, and the rotation ratio is set so that the rotor 20 rotates in stages by 30°, the intake and exhaust opening/closing valves 15 and 16 rotate in stages by 60°, and the opening/closing valves 112 and 122 of the superchargers 111 and 121 rotate in stages by 120°.

The first and second cylinder units 110 and 120 are adapted to implement the expansion, exhaust, intake, and compression strokes independently to complete one-cycle of the rotary engine, similar to the first embodiment. In the present embodiment, the rotors 20 of the first and second cylinder units 110 and 120 are arranged to cross each other with a phase difference of 90°, so as to implement different strokes from each other.

Figure 6A:
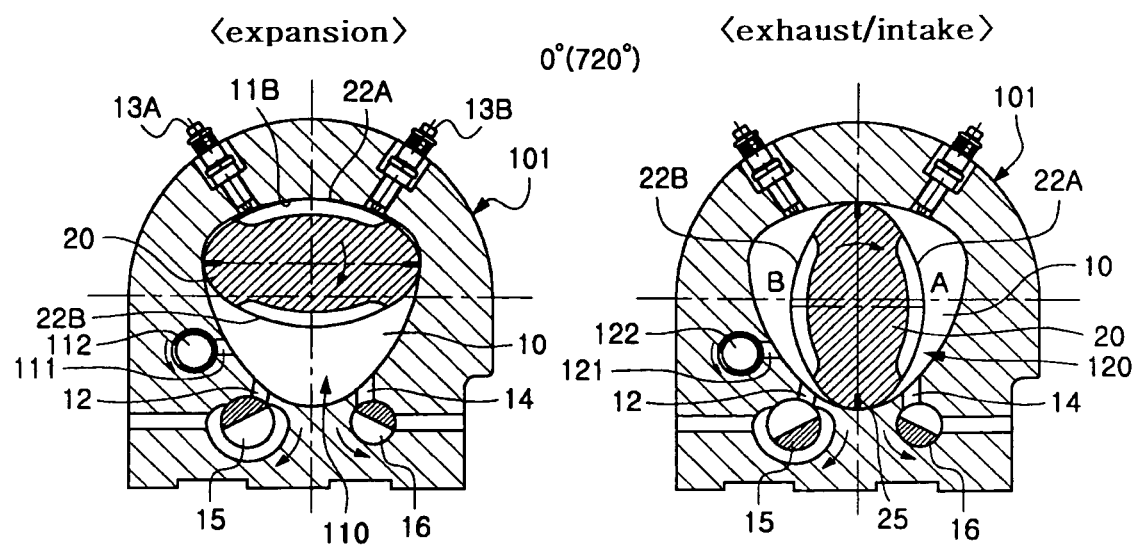
FIGS. 6a to 6f are schematic diagrams illustrating a four stroke cycle of the rotary engine according to the second embodiment of the present invention.
Figure 6B:
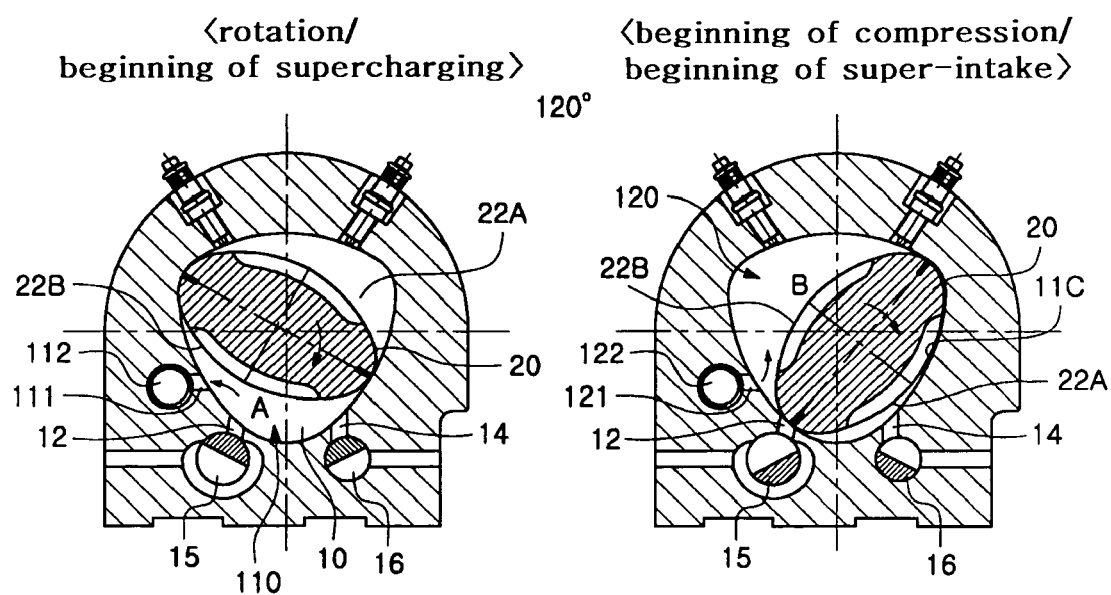
Figure 6C:
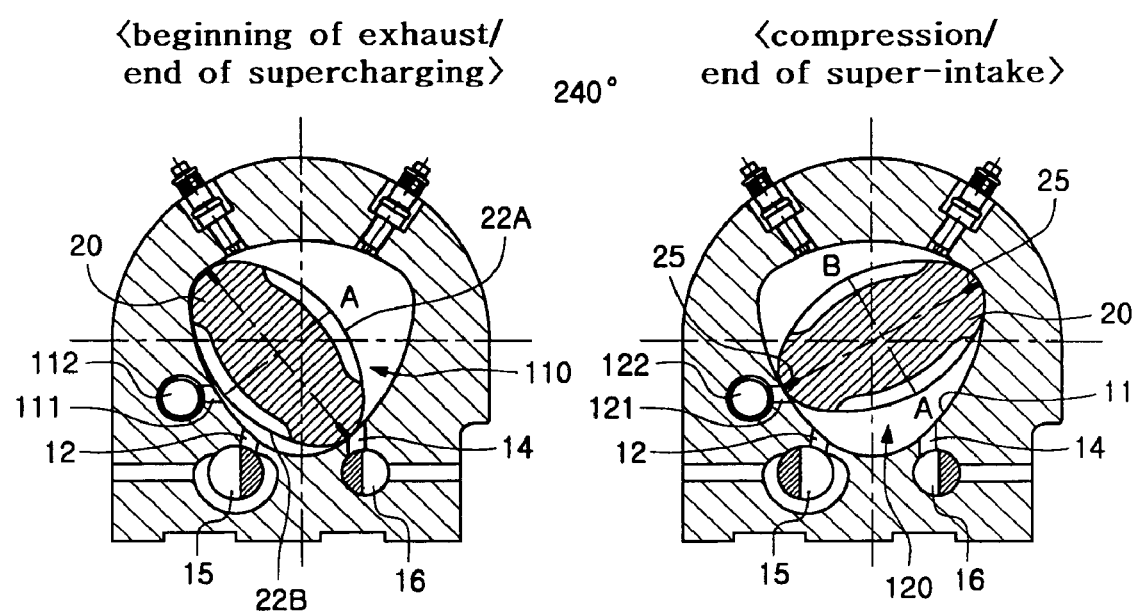

Specifically, in a position wherein the output shaft 102 has a zero rotation angle as shown in FIG. 6a, the first cylinder unit 110 implements an expansion stroke, and the second cylinder unit 120 implements exhaust/intake strokes.

In a position wherein the output shaft 102 rotates by 120° as shown in FIG. 6b, the first cylinder unit 110 delivers rotational power obtained by the expansion stroke to the rotor 20 and, simultaneously, implements a supercharging stroke that will be explained hereinafter. The second cylinder unit 120 begins a compression stroke and, simultaneously, begins a super-intake stroke that will be explained hereinafter.

In a position wherein the output shaft 102 rotates by 240° as shown in FIG. 6c, the first cylinder unit 110 begins an exhaust stroke and, simultaneously, ends the supercharging stroke. The second cylinder unit 120 implements the compression stroke and, simultaneously, ends the super-intake stroke.

Figure 6D:
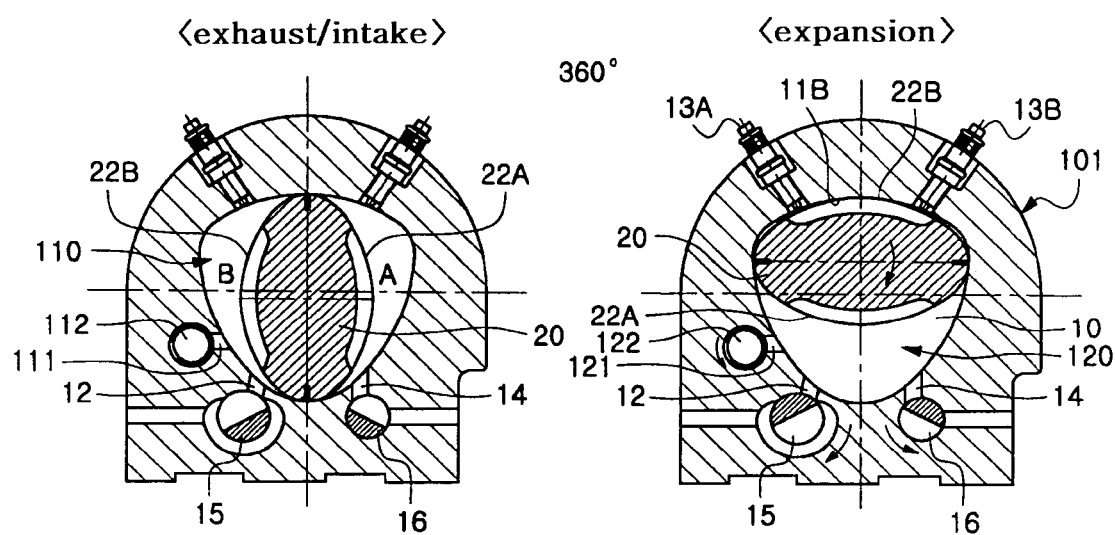

In a position wherein the output shaft 102 rotates one revolution by 360° as shown in FIG. 6d, the first cylinder unit 110 implements exhaust/intake strokes, and the second cylinder unit 120 implements an expansion stroke.

Figure 6E:
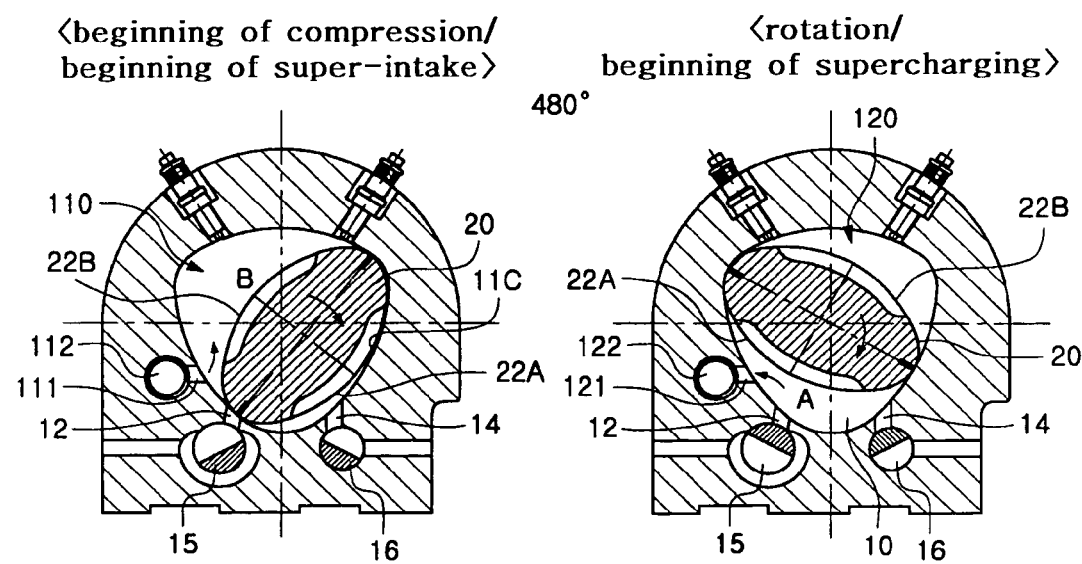

In a position wherein the output shaft 102 rotates by 480° as shown in FIG. 6e, the first cylinder unit 110 begins the compression stroke and, simultaneously, begins a super-intake stroke that will be explained hereinafter. The second cylinder unit 120 obtains the rotational power by the expansion stroke and, simultaneously, beings a supercharging stroke that will be explained hereinafter.

Figure 6F:
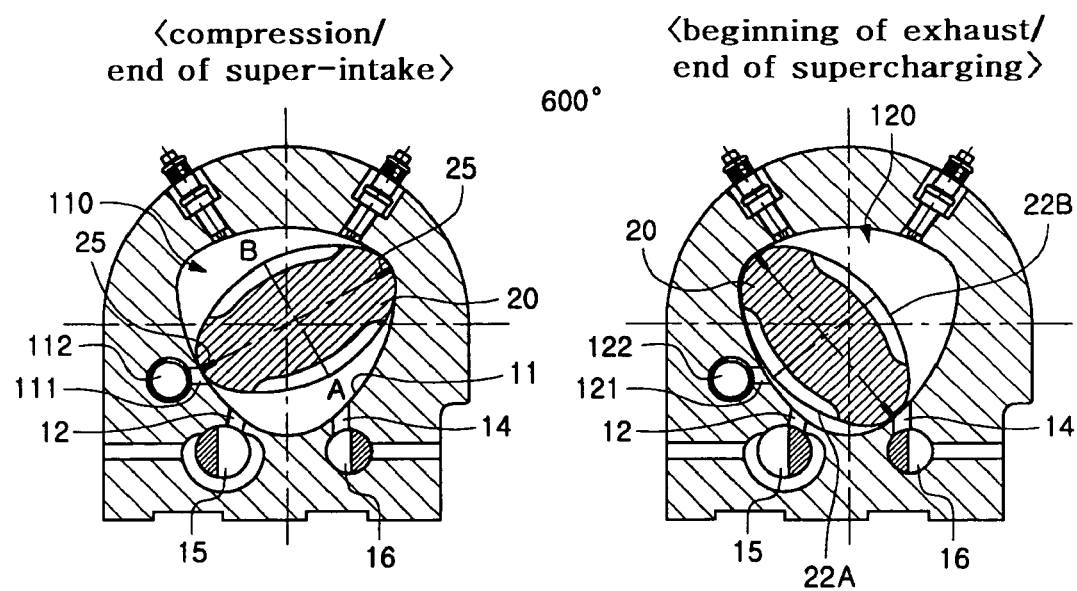

In a position wherein the output shaft 102 rotates by 600° as shown in FIG. 6f, the first cylinder unit 110 implements the compression stroke and, simultaneously, ends the super-intake stroke. The second cylinder unit 120 begins an exhaust stroke and, simultaneously, ends the supercharging stroke.

Finally, as the output shaft 102 rotates two revolutions by 720° as shown in FIG. 6a, the first cylinder unit 110 implements the initial expansion stroke, and the second cylinder unit 120 implements the initial exhaust and intake strokes, completing a four stroke cycle independently.

In the second embodiment of the present invention as stated above, each of the first and second cylinder units 110 and 120 implements both the supercharging and super-intake strokes once per cycle. When the first cylinder unit 110 implements the supercharging stroke, the second cylinder unit 120 implements the super-intake stroke. Conversely, when the second cylinder unit 120 implements the supercharging stroke, the first cylinder unit 110 implements the super-intake stroke.

As shown in FIGS. 6b and 6c, uncombusted gas, which leaks into the section A of the first cylinder unit 110 during the compression stroke, is discharged into the bypass channel 113 through the supercharger 111, which is opened in accordance with rotation of the rotor 20 after the expansion stroke. Then, the discharged uncombusted gas is supercharged into the section B of the second cylinder unit 120, in which the intake stroke is performed, through the supercharger 121 connected to the bypass channel 113. Thereby, the supercharging stroke of the first cylinder unit 110 and the super-intake stroke of the second cylinder unit 120 are able to be simultaneously implemented. During implementation of the supercharging/super-intake strokes, the opening/closing valves 112 and 122 continuously open the superchargers 111 and 121.

Also, as shown in FIGS. 6e and 6f, the uncombusted gas, which leaks into the section A of the second cylinder unit 120 during the compression stroke, is discharged into the bypass channel 113 through the supercharger 121, which is opened in accordance with rotation of the rotor 20 after the expansion stroke. Then, the discharged uncombusted gas is supercharged into the section B of the first cylinder unit 110, in which the intake stroke is implemented, through the supercharger 111 connected to the bypass channel 113. Thereby, the supercharging stroke of the second cylinder unit 120 and the super-intake stroke of the first cylinder unit 110 are able to be simultaneously implemented. During implementation of the supercharging/super-intake strokes, the opening/closing valves 112 and 122 continuously open the superchargers 111 and 121.

With the supercharging/super-intake strokes, the uncombusted gas, which leaks from between the inner circumferential contact wall 11 of the cylinder chamber 10 of one of the cylinder units and the seal members 25 and remains in the section A, is added to the fresh gas mixture, which will be supplied into the intake port 12 of the cylinder chamber 10 of the other cylinder unit, thereby being supercharged into the other cylinder unit during the intake stroke thereof. This increases the intake amount of the gas mixture, thereby achieving an enhancement in generation of rotational power in the expansion stroke. Also, preventing the uncombusted gas from being discharged to the outside has the effect of preventing waste of fuel and air pollution.

With the second embodiment of the present invention, furthermore, when the output shaft 102 rotates two revolutions by 720°, the rotors 20 of the first and second cylinder units 110 and 120 rotate a half revolution by 180°, respectively, so that they implement the expansion, exhaust, intake, and compression strokes in this order with a phase difference of 90°, independently. As a result, the rotary engine can achieve twice the rotational power of the first embodiment by implementing the expansion stroke once per one revolution of the output shaft 102.

Figure 7A:
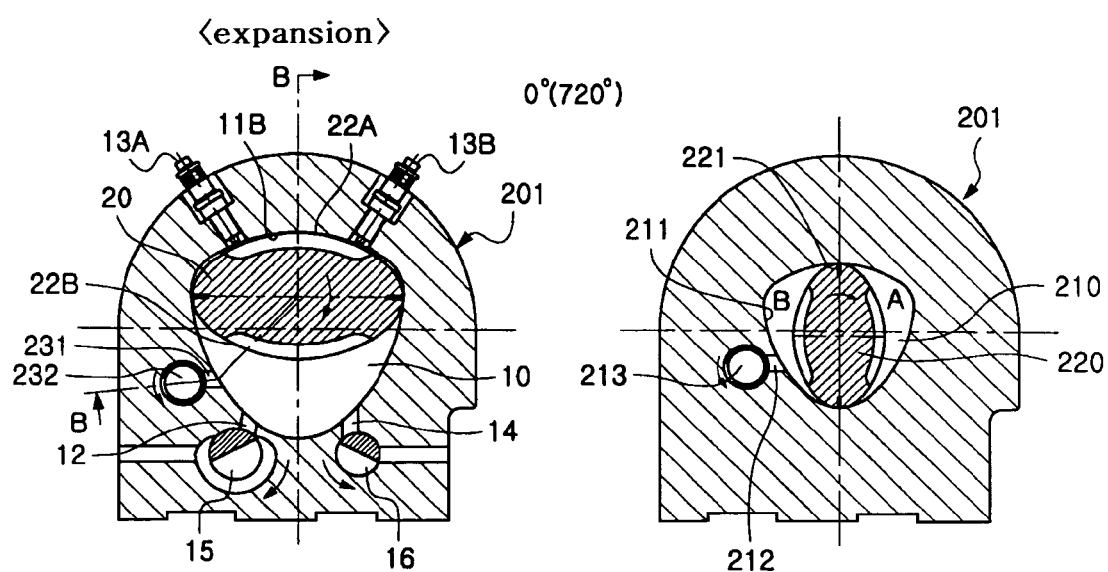
FIGS. 7a to 7f are schematic diagrams illustrating a four stroke cycle of a rotary engine according to a third embodiment of the present invention.
Figure 7B:
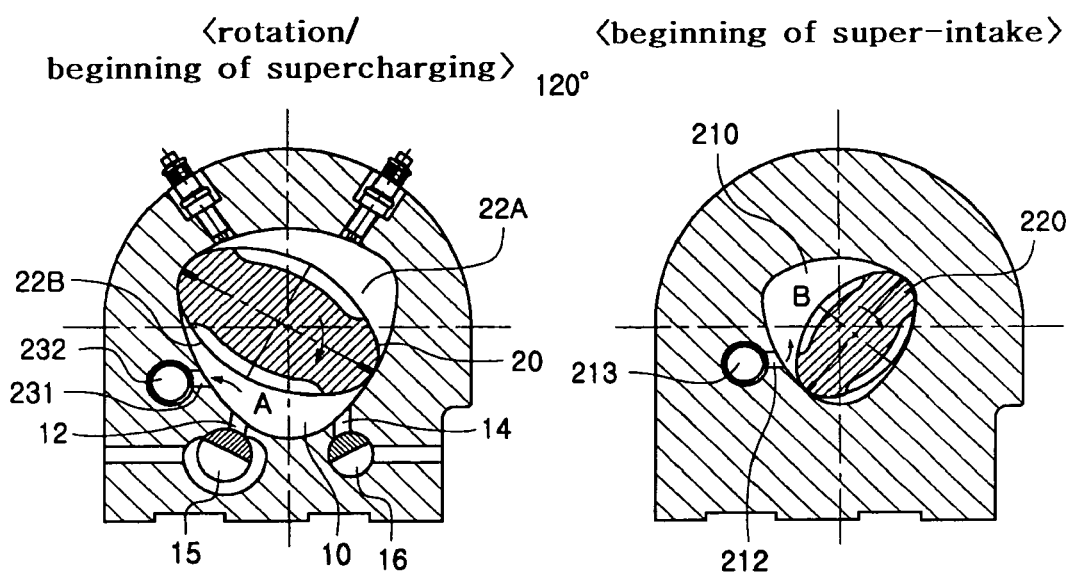
Figure 7C:
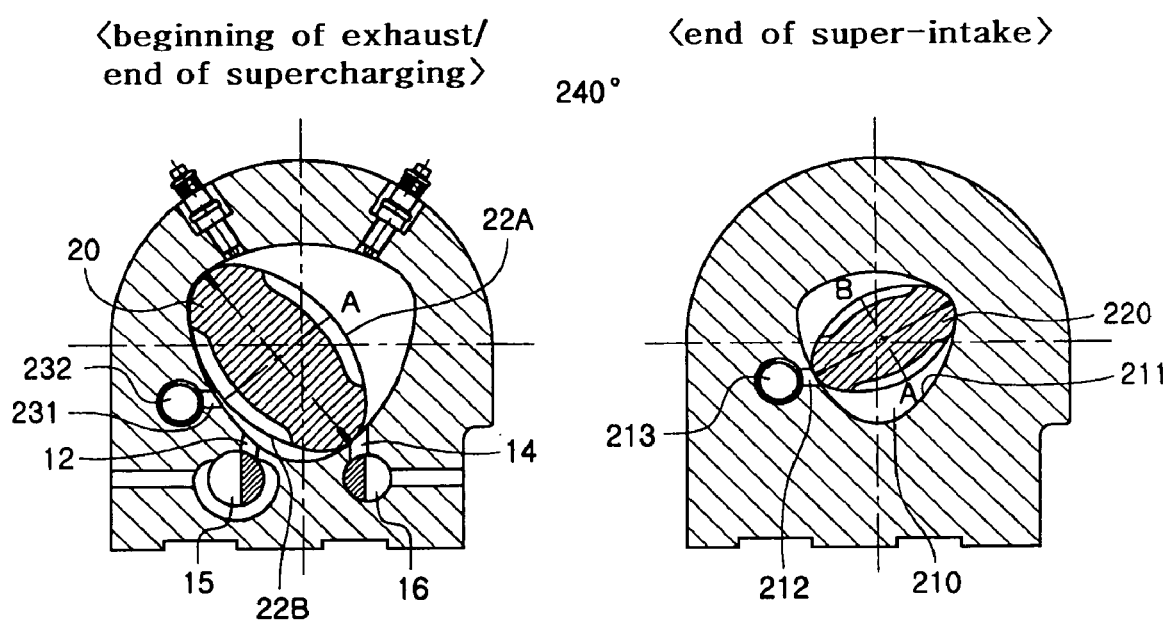
Figure 7D:
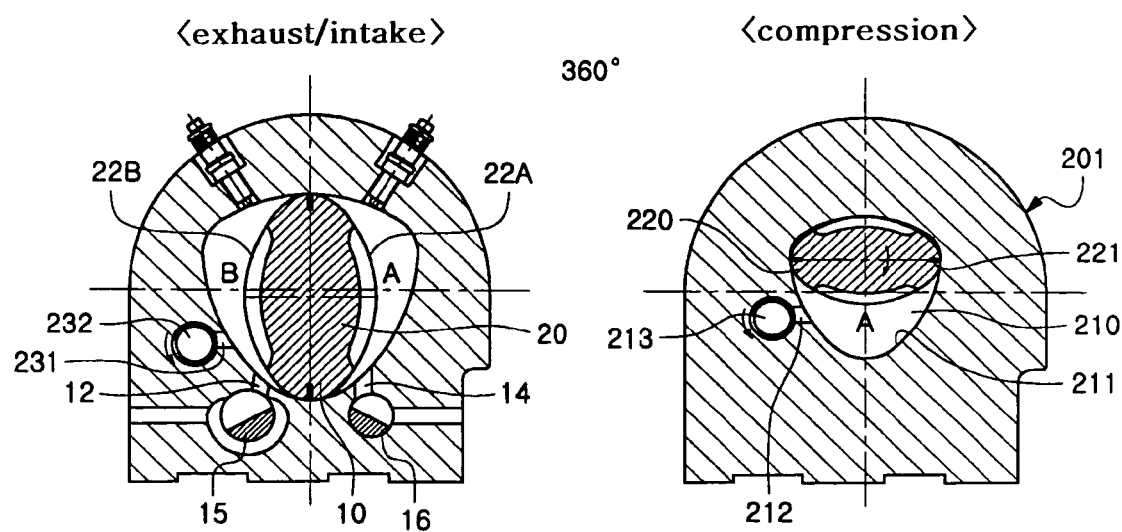
Figure 7E:
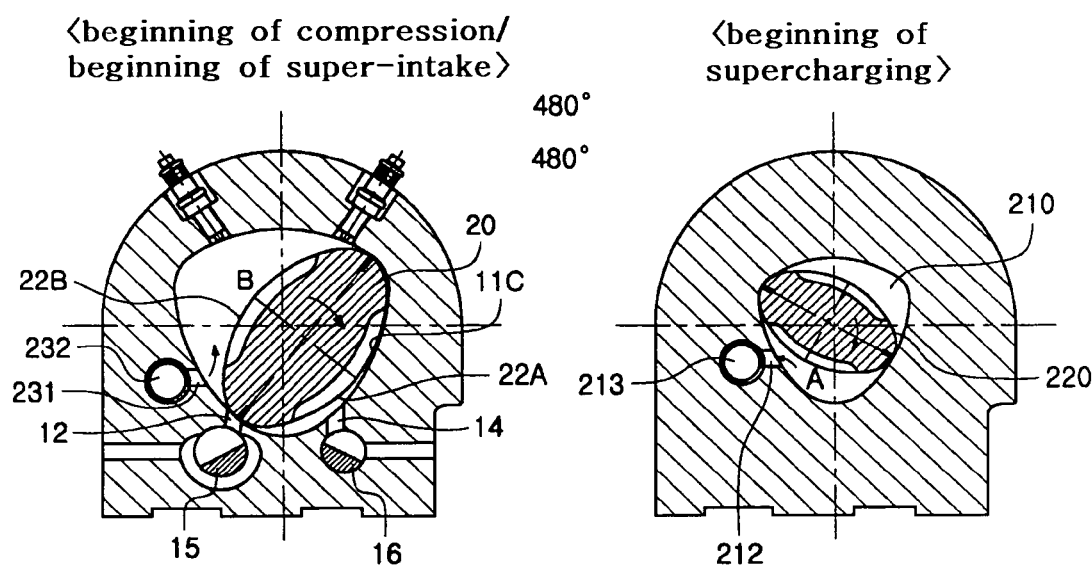
Figure 7F:
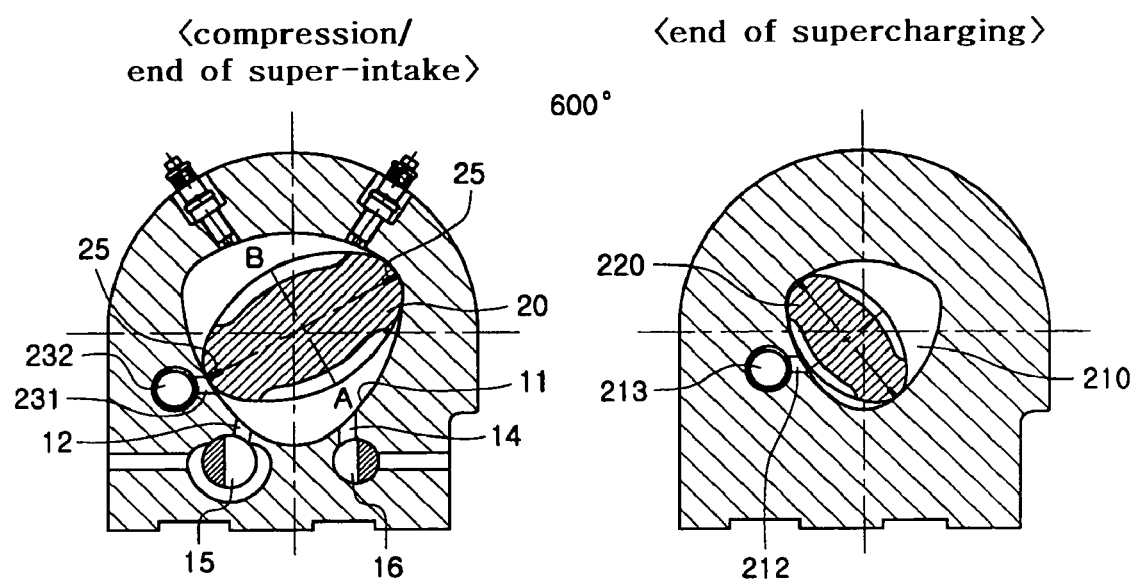
Figure 8:
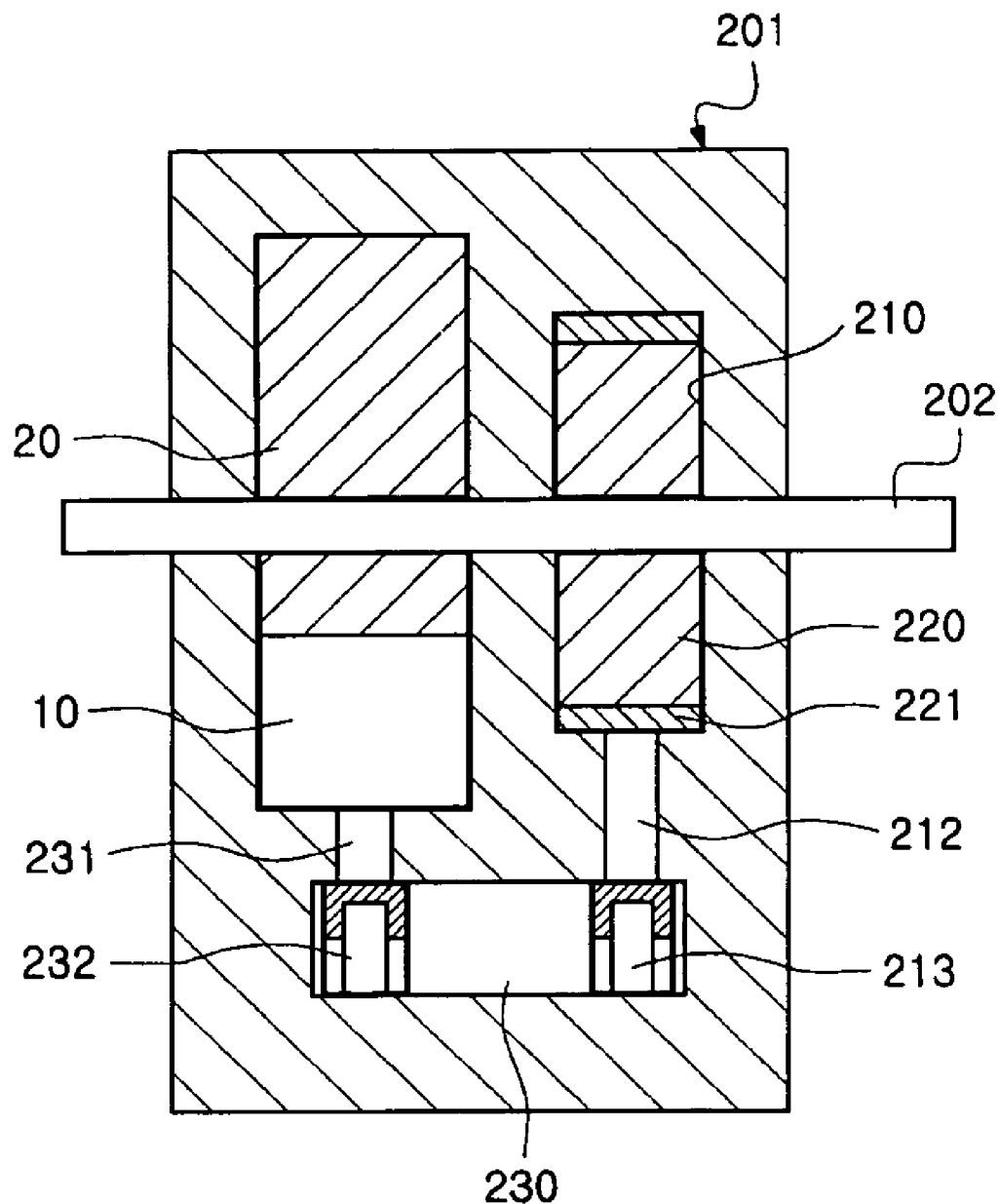

FIGS. 7 and 8 illustrate a rotary engine according to a third embodiment of the present invention. The rotary engine of the present embodiment comprises supercharging means in addition to the elements of the first embodiment. In the following description, elements identical to those of the first embodiment are designated by the same reference numerals, and no detailed description will be given.

The supercharging means of the rotary engine according to the present embodiment includes a supercharging chamber 210 which is formed in a cylinder body 201 in parallel to the cylinder chamber 10 in an axial direction of an output shaft 202, and a rotor 220 which is received in the supercharging chamber 210 to eccentrically rotate.

The supercharging chamber 210 has the same shape as the cylinder chamber 10, but is smaller than the cylinder chamber 10. The supercharging chamber 210 is provided with an inner circumferential contact surface 211. The rotor 220 has the same shape as the rotor 20, but is smaller than the rotor 20. The rotor 220 is provided at seal faces thereof with seal members 221. The rotor 220 rotates at the same rotation ratio as the rotor 20 upon receiving rotational power from the output shaft 202 (See FIG. 2). The rotors 220 and 20 are arranged to cross each other with a phase difference of 90°.

The supercharging means further includes a supercharger 231 provided between the intake port 12 of the cylinder chamber 10 and the spark plug 13A, i.e. at the first side 11A of the cylinder chamber 10, and a supercharger 212 provided on the supercharging chamber 210 at a position corresponding to the supercharger 231. Referring to FIG. 8, both the superchargers 231 and 212 are connected to each other via a bypass channel 230, which is also formed in the cylinder body 201. Opening/closing valves 232 and 213 are provided at the superchargers 231 and 212, respectively.

Referring to FIGS. 7b and 7c, the opening/closing valve 232 opens the supercharger 231 of the cylinder chamber 10 from the rotational power generation stroke/the beginning of a supercharging stroke to the beginning of an exhaust stroke/the end of the supercharging stroke. Also, the opening/closing valve 213 opens the supercharger 212 of the supercharging chamber 210 from the beginning of a super-intake stroke to the end of the super-intake stroke. Referring to FIGS. 7e and 7f, the opening/closing valve 232 opens the supercharger 231 of the cylinder chamber 10 from the beginning of a compression stroke/the beginning of a super-intake stroke to the compression stroke/the end of the super-intake stroke. The opening/closing valve 213 opens the supercharger 212 of the supercharging chamber 210 from the beginning of a supercharging stroke to the end of the supercharging stroke.

The opening/closing valves 232 and 231 having the above-described configuration are adapted to rotate at a predetermined rotation ratio relative to the output shaft 202 upon receiving rotational power from the output shaft 202 via rows of gears (not shown). In the present embodiment, the rotation ratio is 1:1.

Now, the four stroke cycle of the rotary engine according to the third embodiment of the present invention will be explained with reference to FIGS. 7a to 7f. In the same manner as the first embodiment, the output shaft 202 rotates in stages by 120°, and the rotation ratio is set so that the rotors 20 and 220 rotate in stages by 30°, the opening/closing valves 15 and 16 of the intake port 12 and the exhaust port 14 rotate in stages by 60°, and the opening/closing valves 232 and 213 of the superchargers 231 and 212 rotate in stages by 120°.

Thereby, if the output shaft 202 rotates two revolutions, the cylinder chamber 10 implements expansion, exhaust, intake, and compression strokes in this order in the same manner as the first embodiment. The supercharging chamber 210 implements the supercharging stroke once.

Specifically, in a position wherein the output shaft 202 has a zero rotation angle as shown in FIG. 7a, the cylinder chamber 10 implements an expansion stroke. The rotor 220 of the supercharging chamber 210 and the rotor 20 of the cylinder chamber 10 cross each other with a phase difference of 90°.

In a position wherein the output shaft 202 rotates by 120° as shown in FIG. 7b, the cylinder chamber 10 delivers rotational power obtained by the expansion stroke to the rotor 20 and, simultaneously, begins a supercharging stroke that will be explained hereinafter. The supercharging chamber 210 begins a super-intake stroke that will be explained hereinafter.

In a position wherein the output shaft 202 rotates by 240° as shown in FIG. 7c, the cylinder chamber 10 begins an exhaust stroke and, simultaneously, ends the supercharging stroke. The supercharging chamber 210 ends the super-intake stroke.

During the supercharging/super-intake strokes, uncombusted gas, which leaks into the section A of the cylinder chamber 10 during the compression stroke, is discharged into the bypass channel 230 through the supercharger 231, which is opened in accordance with rotation of the rotor 20 after the expansion stroke. Then, the discharged uncombusted gas is supercharged into the section B of the supercharging chamber 210 through the supercharger 212 connected to the bypass channel 230. Thereby, the supercharging and super-intake strokes are able to be simultaneously implemented. During implementation of the supercharging/super-intake strokes, the opening/closing valves 232 and 213 continuously open the superchargers 231 and 212.

In a position wherein the output shaft 202 rotates one revolution by 360° as shown in FIG. 7d, the cylinder chamber 10 implements exhaust/intake strokes, and the supercharging chamber 210 implements a compression stroke of uncombusted gas stored in the section B of the supercharging chamber 210.

In a position wherein the output shaft 202 rotates by 480° as shown in FIG. 7e, the cylinder chamber 10 begins a compression stroke and, simultaneously, beings a super-intake stroke that will be explained hereinafter. The supercharging chamber 210 begins a supercharging stroke that will be explained hereinafter.

In a position wherein the output shaft 202 rotates by 600° as shown in FIG. 7f, the cylinder chamber 10 implements the compression stroke and, simultaneously, ends the super-intake stroke. The supercharging chamber 210 ends the supercharging stroke.

During the super-intake and supercharging strokes, uncombusted gas, which leaks into the section A of the supercharging chamber 210 during the compression stroke, is discharged into the bypass channel 230 through the supercharger 212, which is forcibly opened by the rotor 220. Then, the discharged uncombusted gas is supercharged into the section B of the cylinder chamber 10, in which the intake stroke is implemented, through the supercharger 231 connected to the bypass channel 230. Thereby, the supercharging and super-intake strokes are able to be simultaneously implemented. During implementation of the supercharging/super-intake strokes, the opening/closing valves 232 and 213 are continuously open the superchargers 231 and 212.

Finally, as the output shaft 202 rotates two revolutions by 720° as shown in FIG. 7a, the rotors 20 and 220 of the cylinder chamber 10 and supercharging chamber 210 return to their original positions, completing a four stroke cycle independently.

With the supercharging means according to the third embodiment of the present invention, the uncombusted gas, which leaks from between the inner circumferential contact wall 11 of the cylinder chamber 10 and the seal members 25 during the compression stroke and remains in the section A of the cylinder chamber 10, is charged into the supercharging chamber 210. After being temporarily stored in the supercharging chamber 210, the uncombusted gas is able to be returned from the supercharging chamber 210 into the cylinder chamber 10 during the intake stroke of the cylinder chamber 10. This effectively increases the intake amount of the gas mixture while preventing discharge of the uncombusted gas to the outside, thereby achieving an enhancement in generation of rotational power in an expansion stroke and preventing waste of fuel and air pollution.

In the preferred embodiments of the present invention as described above, the rotary engine is configured to have a single cylinder unit, two cylinder units connected to each other via a bypass channel, or a single cylinder unit provided with supercharging means, but the present invention is not limited thereto. Alternatively, in order to achieve a further enhancement of engine output, it may be considered that a plurality of independently operating cylinder units may be arranged on the output shaft in parallel to one another, that a plurality of groups, each group including two cylinder units connected to each other via a bypass channel, is arranged on the output shaft in parallel to one another to operate per each group, or that a plurality of cylinder units each having the supercharging means is arranged on the output shaft in parallel to one another to operate independently.

As is apparent from the above description, the rotary engine of the present invention has the effect of improving sealing performance between an inner circumferential contact wall of a cylinder chamber and seal members of a rotor, thereby achieving an enhancement in the efficiency of fuel combustion and an enhancement in engine output.

Further, according to the present invention, it is possible to prevent gas mixture, which leaks into a specific region of one of cylinder units during the compression stroke, from being discharged to the outside, and to allow the leaked gas mixture to be supercharged into the other cylinder unit in which the intake stroke is implemented, thereby achieving an enhancement of engine output, and preventing waste of fuel and air pollution.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A rotary engine comprising:
   a cylinder body having a cylinder chamber, an intake port, an exhaust port, and at least one spark plug; and
   a rotor received in the cylinder chamber and adapted to eccentrically rotate while coming into contact at seal faces thereof with an inner circumferential contact wall of the cylinder chamber to thereby implement intake, compression, expansion, and exhaust strokes,
   wherein the cylinder chamber is divided into two sub-cylinder chambers by the seal faces,
   wherein the rotor has an elliptical outer contour, and the inner circumferential contact wall of the cylinder chamber coincides with a specific curve, which is described by opposite apexes of the elliptical rotor in a direction of a major axis, when the rotor eccentrically rotates,
   wherein the inner circumferential contact wall of the cylinder chamber includes a first side having the intake port, a second side having the spark plug, and a third side having the exhaust port, the first to third sides being successively formed,
   wherein the intake port is provided with an opening/closing intake valve which closes the intake port from the beginning of an expansion stroke to the beginning of the exhaust stroke and opens the intake port from the beginning of the exhaust stroke to the beginning of a next expansion stroke, and
   wherein the exhaust port is provided with an opening/closing exhaust valve which opens the exhaust port from the beginning of the exhaust stroke to the end of the exhaust stroke and closes the exhaust port from the end of the exhaust stroke to the beginning of a next exhaust stroke, and
   wherein the exhaust stroke in one of the two sub-cylinder chambers is implemented at the same time the intake stroke in the other thereof is implemented when either of the seal faces is between the intake port and the exhaust port and both of the intake/exhaust valves are open,
   wherein the cylinder chamber, rotor, and opening/closing valves form a single cylinder unit, and a plurality of the cylinder units is arranged in parallel to one another in an axial direction of an output shaft,
   wherein the two cylinder units form a group so that the rotors thereof are arranged to cross each other with a phase difference of 90°, and
   wherein two superchargers are provided, respectively, between the intake port and the spark plug of a respective one of the two cylinder units, and are connected to supply uncombusted gas in the respective cylinder unit into the other via a bypass channel, each supercharger being provided with an opening/closing valve.

2. A rotary engine comprising:
   a cylinder body having a cylinder chamber, an intake port, an exhaust port, and at least one spark plug; and
   a rotor received in the cylinder chamber and adapted to eccentrically rotate while coming into contact at seal faces thereof with an inner circumferential contact wall of the cylinder chamber to thereby implement intake, compression, expansion, and exhaust strokes,
   wherein the cylinder chamber is divided into two sub-cylinder chambers by the seal faces,
   wherein the rotor has an elliptical outer contour, and the inner circumferential contact wall of the cylinder chamber coincides with a specific curve, which is described by opposite apexes of the elliptical rotor in a direction of a major axis, when the rotor eccentrically rotates, wherein the inner circumferential contact wall of the cylinder chamber includes a first side having the intake port, a second side having the spark plug, and a third side having the exhaust port, the first to third sides being successively formed, wherein the intake port is provided with an opening/closing intake valve which closes the intake port from the beginning of an expansion stroke to the beginning of the exhaust stroke and opens the intake port from the beginning of the exhaust stroke to the beginning of a next expansion stroke, and wherein the exhaust port is provided with an opening/closing exhaust valve which opens the exhaust port from the beginning of the exhaust stroke to the end of the exhaust stroke and closes the exhaust port from the end of the exhaust stroke to the beginning of a next exhaust stroke, and wherein the exhaust stroke in one of the two sub-cylinder chambers is implemented at the same time the intake stroke in the other thereof is implemented when either of the seal faces between the intake port and the exhaust port and both of the intake/exhaust valves are open, further comprising supercharging means for temporarily storing uncombusted gas, which leaks from between the inner circumferential contact wall of the cylinder chamber and seal faces during the compression stroke and for supercharging the stored uncombusted gas into the cylinder chamber in which the intake stroke is implemented, wherein the supercharging means includes:

a supercharging chamber having the same shape as the cylinder chamber and provided in the cylinder body to be arranged on the output shaft in parallel to the cylinder chamber;

a supercharging rotor having the same shape as the rotor of the cylinder chamber and received in the supercharging chamber to eccentrically rotate, the supercharging rotor of the supercharging chamber and the rotor of the cylinder chamber crossing each other with a phase difference of 90°;

a first supercharger provided between the intake port and the spark plug of the cylinder chamber;

a second supercharger provided on the supercharging chamber at a position corresponding to the first supercharger;

a bypass channel to connect the first and second superchargers to each other; and opening/closing valves provided at the first and second superchargers to open or close the superchargers.

* * * * *